Feb. 19, 1963    W. L. COLTERJOHN, JR    3,078,408
CAPACITOR CHARGING MAGNETIC AMPLIFIER
Filed Feb. 5, 1959    2 Sheets-Sheet 1
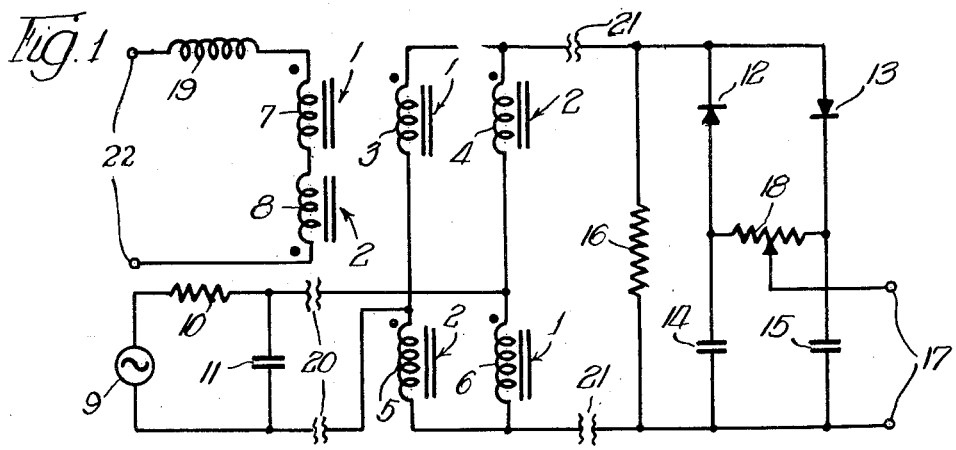
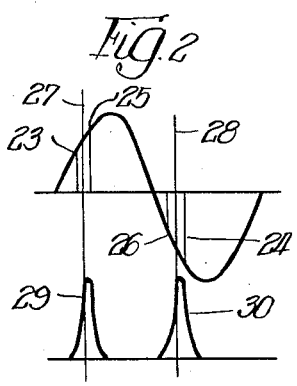
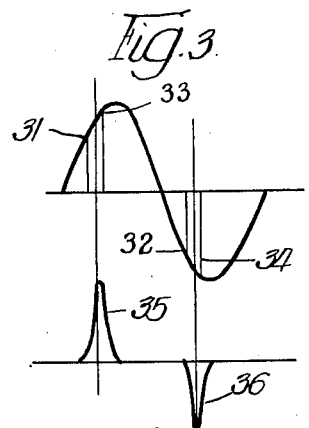
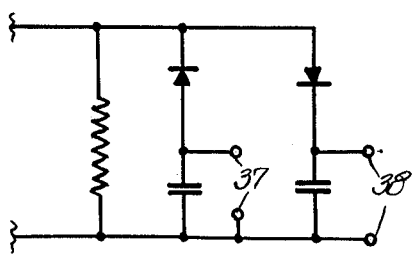
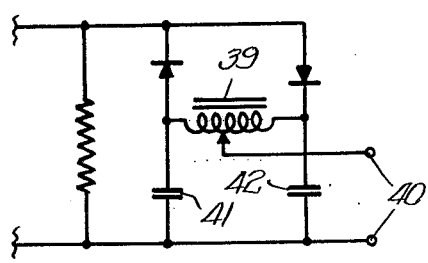
INVENTOR.
Walter L. Colterjohn, Jr.,
BY
Byron Hume Groen & Clement
ATTYS.

Feb. 19, 1963 W. L. COLTERJOHN, JR 3,078,408
CAPACITOR CHARGING MAGNETIC AMPLIFIER
Filed Feb. 5, 1959 2 Sheets-Sheet 2

INVENTOR.
Walter L. Colterjohn, Jr.,
BY
Byron Hume Groen & Clement
ATTYS.

3,078,408
CAPACITOR CHARGING MAGNETIC AMPLIFIER
Walter L. Colterjohn, Jr., 217 S. Taylor Ave.,
Oak Park, Ill.
Filed Feb. 5, 1959, Ser. No. 791,429
7 Claims. (Cl. 320—1)

This invention relates to electric amplification systems utilizing controlled magnetic saturation and more particularly to such systems wherein capacitor charging in output circuits is utilized.

Magnetic amplifiers generally obtain variation in output in proportion to the variation in the saturation period relative to the alternating current source period. To obtain full range of output the control signal must vary saturation anywhere from one-eighth of a cycle to one-half of a cycle. This requirement limits amplifier performance, especially with regard to power gain.

The magnetic amplifiers of this invention make use of novel improvements whereby a full range in output can be obtained by a small variation in the saturation period. The time difference between the saturating of saturable magnetic cores is utilized to effect a charging of capacitors in the output circuit. More particularly, during the period between the saturating of two or more cores, special circuits, including windings on the cores, are thrown into a condition of unbalance due to the difference in impedance of the windings on the saturated and unsaturated cores. This unbalance causes a substantial portion of the potential of the power source to be applied across the output circuit. During this period of unbalance, capacitors in the output circuit charge very rapidly. A relatively short period between saturation of the cores results in a substantial output. Since the control signal need only vary the differential saturation period by a small amount to effect a large output variation, very high power gains can be obtained.

An important object of this invention is to provide a type of magnetic amplifier that achieves substantially full output variation with a comparatively short differential saturation period varriation.

Another object of this invention is to provide a type of magnetic amplifier that utilizes capacitive charging in its output and has high gain, fast response and low noise.

Another object of this invention is to provide specific magnetic amplifier designs which effectively utilize the principles of operation herein described.

Other objects and many of the advantages of this invention will become better understood and appreciated by reference to the following description considered in connection with the accompanying drawings, wherein:

FIGURE 1 is a schematic diagram illustrating a bridge arrangement of a magnetic amplifier of the capacitor charging type as contemplated by the invention;

FIGURES 2 and 3 are diagrams of current-voltage relations in a capacitor charging magnetic amplifier such as shown in FIGURE 1;

FIGURES 4A and 4B are schematic diagrams of the output networks;

Figure 5A:
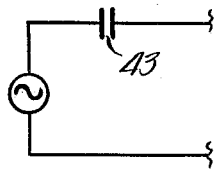
FIGURES 5A, 5B and 5C are schematic diagrams of the input networks.

FIGURE 1 illustrates a bridge arrangement of a magnetic amplifier which utilizes capacitive charging in the output circuit. The saturable cores designated 1 and 2 are each wound with a pair of gate windings 3 and 6, on core 1, and 4 and 5 on core 2. The gate windings are connected together as arms in a bridge arrangement in such a sense that flux is induced additively in each core by current flowing between opposite diagonal points. An alternating current potential from a supply source 9 is applied across one diagonal through a current limiting resistor 10. The capacitor 11 in this source input circuit provides a low surge impedance to the bridge. The output circuit to the right of 21, connected to the other diagonal, is characterized by series combinations of unidirectional impedance elements 12 and 13 and output capacitors 14 and 15. The elements 12 and 13 serve to prevent discharge of 14 and 15 through the gate windings. The final output 17 is taken as the sum of the charge accumulation on the capacitors 14 and 15 through the potentiometer 18. Control windings 7 and 8 are also provided on the cores 1 and 2, wound in such sense as to differentially vary the firing angles of cores 1 and 2 in response to a control signal applied at 22 through choke 19. The resistor 16 provides for improved stability.

The cores 1 and 2 can be wound or referenced to saturate simultaneously or at different phase angles. FIGURE 2 illustrates voltage and current relationships in the bridge amplifier in which simultaneous saturation at zero control signal occurs. When a control signal is applied, one of the cores saturates at 23 and 24 while the other core saturates at 25 and 26. The zero control signal phase angles are indicated as 27 and 28. The output current pulses 29 and 30 are of the same polarity due to the alternation of both the leading core and the supply potential. The current pulses occur as indicated during the periods between the saturation of the two cores.

FIGURE 3 illustrates voltage and current relationships in the bridge amplifier in which the cores saturate at different phase angles. In this case one core saturates first at 31 and 32 on both half cycles while the other core follows it at 33 and 34. Output current pulses of opposite polarity 35 and 36 are obtained. The effect of a control signal is to decrease the output of one polarity and increase the output of the other polarity by respectively decreasing and increasing the differential saturation period on the alternate half cycles of supply potential. The modes of operation illustrated in both FIGURES 2 and 3 may be used to provide a polarity reversible output using the output circuitry of FIGURE 1.

Several modifications of output circuitry which may be used on the bridge amplifier of FIGURE 1 as well as on other amplifiers of this type are illustrated. FIGURE 4A shows independent outputs of opposite polarity at 37 and 38. This may be used for instance in operating torque motors or polarized relays with two coils. FIGURE 4B shows a combined output 40 obtained from a center-tapped coke 39 bridging the two output capacitors 41 and 42. This may be considered for applications requiring a single reversible output at higher efficiency than can be realized using center-tapped resistors.

Figure 5B:
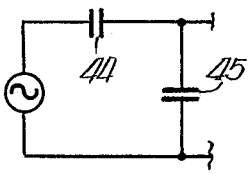
Figure 5C:
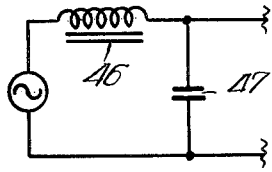

Several modifications of input circuitry which may be used on the bridge amplifier of FIGURE 1, as well as on other amplifiers, are illustrated. FIGURE 5A shows a single capacitor 43 which serves to limit current flow. This input circuit may be used with an adequately low impedance power source capable of tolerating high surge currents. FIGURE 5B illustrates a circuit consisting of a current limiting capacitor 44 and a bridge shunting capacitor 45. This circuit could be used to provide adequate surge current when the source is of higher impedance. The circuit illustrated in FIGURE 5C, consisting of a current limiting reactor 46 and shunting capacitor 47, restricts surge loading of the supply as does the resistor-capacitor input circuit of FIGURE 1.

Figure 6:
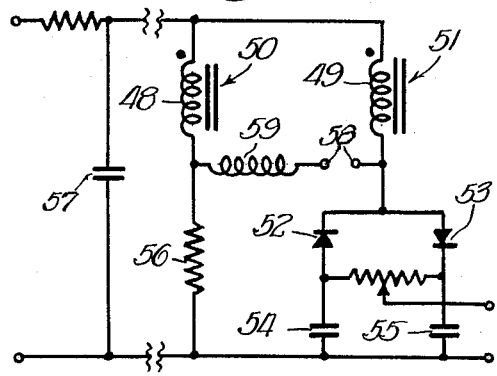
FIGURE 6 is a schematic diagram of a parallel reactor arrangement of a capacitor charging magnetic amplifier coming within the invention.

FIGURE 6 illustrates a parallel reactor arrangement for a magnetic amplifier using capacitive output charging. Single gate windings 48 and 49 are wound on saturable cores 50 and 51. An output circuit, consisting of unidirectional impedance elements 52 and 53 connected in opposite sense in series, respectively, with output capacitors 54 and 55, is connected to one of the saturable reactors across the input circuit. The other saturable reactor connected to the resistor 56 shunts this circuit. A differential control signal can be applied to the gate windings at 58 through blocking choke 59. Control signals can also be applied to a separate set of control windings on the cores. The portion of the energy of capacitor 57 that is delivered to the output circuit on each half cycle is controlled by the relative saturation periods of cores 50 and 51 as influenced by the control signal.

Figure 7:
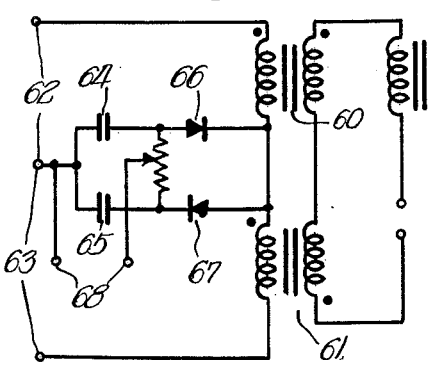
FIGURE 7 is a schematic diagram of a series reactor arrangement of a capacitor charging magnetic amplifier for a center-taped source supply.

FIGURE 7 illustrates a magnetic amplifier using capacitive output charging in which two saturable reactors 60 and 61 are connected in series across a center-tapped potential source 62 and 63. Output capacitors 64 and 65, in series with the discharge blocking rectifiers 66 and 67, are connected to the supply center-tap and to the point between the reactors. A single reversible output 68 is illustrated. Output capacitor charging is again a function of the time increment between the saturation of the two cores as influenced by the control signal applied to the series-opposed windings on the cores.

Figure 8:
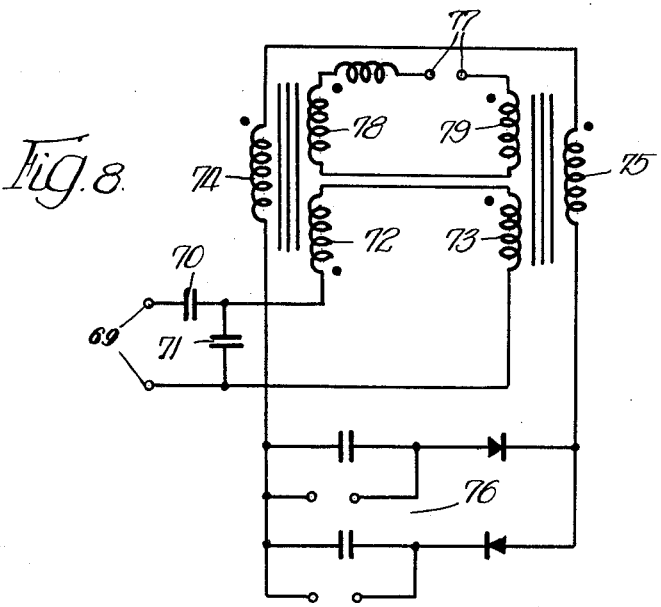
FIGURE 8 is a schematic diagram of a series saturable transformer arrangement of a capacitor charging magnetic amplifier.

FIGURE 8 illustrates another magnetic amplifier arrangement utilizing capacitor output charging. Power supply potential 69 is applied through the input network 70 and 71 to the primaries 72 and 73 of two saturable transformers. The secondaries 74 and 75 of these transformers are connected in series opposition to the output network 76. A control signal 77 is applied to windings 78 and 79 in series opposition so as to accelerate the saturation of one core and retard the saturation of the other. Upon saturation of one core the unopposed potential of the other transformer causes the transference of the charge to the output network.

Obviously, many modifications of the present invention are possible in view of the above teachings. It is therefore to be understood that within the scope of the appended claims the invention may be practiced otherwise than as specifically described.

What is claimed is:

1. A magnetic amplifier system in which output capacitors are charged as a result of circuit unbalance caused by the non-simultaneous saturation of the magnetic cores of reactive elements, the combination including a pair of reactive elements each having a saturable magnetic core, at least one gate winding on each core and said winding being electrically connected one to the other, a source of alternating current potential connected to said windings, an output circuit also in electrical connection with the windings, said output circuit including a pair of conductors in parallel relation and with each conductor having a capacitor and a rectifying element connected in series, the said rectifying elements serving to prevent discharge of the capacitors through the gate windings, means connecting said capacitors to load impedance means, and control windings magnetically coupled to the gate windings for controlling the saturation periods of said cores.

2. A magnetic amplifier system as defined by claim 1, additionally including current limiting means in the circuit connecting the source of alternating current potential to the said windings.

3. A magnetic amplifier system in which output capacitors are charged as a result of circuit unbalance caused by the non-simultaneous saturation of the magnetic cores of reactive elements, the combination including two saturable magnetic cores, a pair of gate windings on each core and said gate windings being connected together as arms in a bridge arrangement in such sense that flux is induced additively in each core by current flowing between certain opposite diagonal terminals, a source of alternating current potential connected to said bridge arrangement at said opposite diagonal terminals, an output circuit including a pair of conductors connected in parallel across the other opposite diagonal terminals of the bridge arrangement, a capacitor and a unidirectional impedance element in series in each conductor, said unidirectional impedance elements serving to prevent discharge of the capacitors through the gate windings, a load circuit connected across the terminals of the capacitors, and a control winding on each of the magnetic cores.

4. A magnetic amplifier system as defined by claim 1, wherein the control windings are so wound and connected as to differentially vary the phase angle at which the cores saturate in response to a control signal.

5. A magnetic amplifier system in which output capacitors are charged as a result of circuit unbalance caused by the non-simultaneous saturation of the magnetic cores of reactive elements, in combination, a pair of saturable magnetic cores, a source of alternating current potential, at least one primary winding on each of said cores, circuit means joining the primary windings in series relation and said means connecting the same to said alternating current source, at least one secondary winding on each core and which are connected in series relation, an output circuit electrically connected to the secondary windings and including at least two conductors in parallel relation across the terminals of the output circuit, each conductor including a unidirectional impedance element and a capacitor in series, said unidirectional impedance elements serving to prevent discharge of the capacitors through the secondary windings, means connecting said capacitors to a load impedance, and means including a control winding on each core for controlling the saturation periods of said cores.

6. A magnetic amplifier system as defined by claim 1, additionally including a capacitor connected across the terminals of the circuit which connects the windings to the source of alternating current potential.

7. A magnetic amplifier system as defined by claim 5, additionally including a capacitor connected across the terminals of the circuit which connects the primary windings to the alternating current source.

References Cited in the file of this patent

UNITED STATES PATENTS

| 2,552,203 | Morgan | May 8, 1951 |
| 2,573,818 | Votruba | Nov. 6, 1951 |
| 2,892,146 | Malsbary | June 23, 1959 |
| 2,894,198 | McDonald | July 7, 1959 |
| 2,953,751 | Lynn et al. | Sept. 20, 1960 |